June 8, 1937. E. E. LINDSEY 2,083,072
APPARATUS FOR MAKING ICE CREAM AND OTHER EDIBLE ICES
Filed Aug. 16, 1932
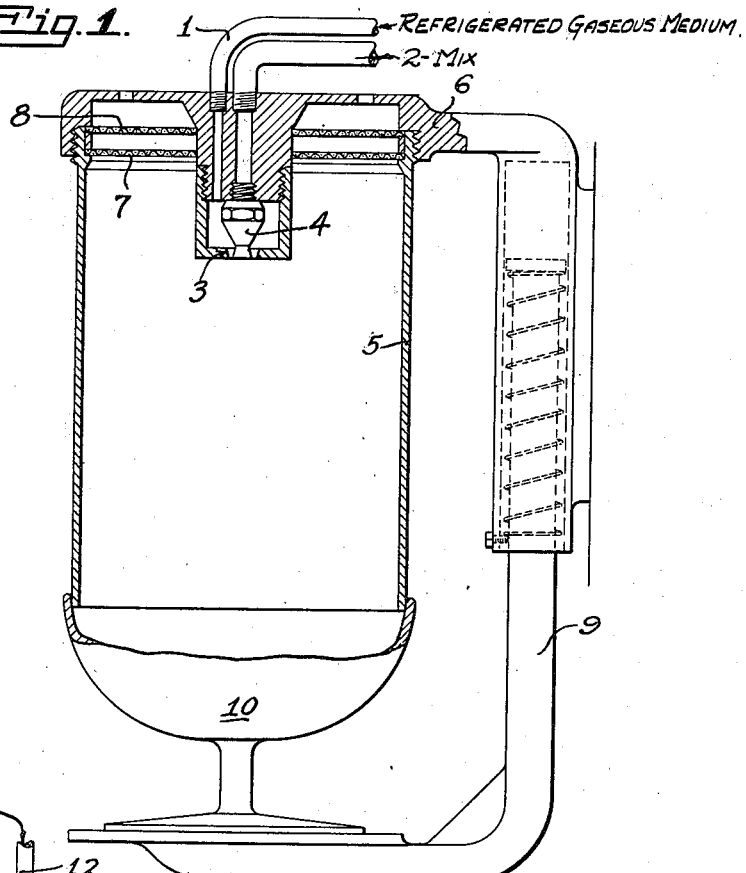
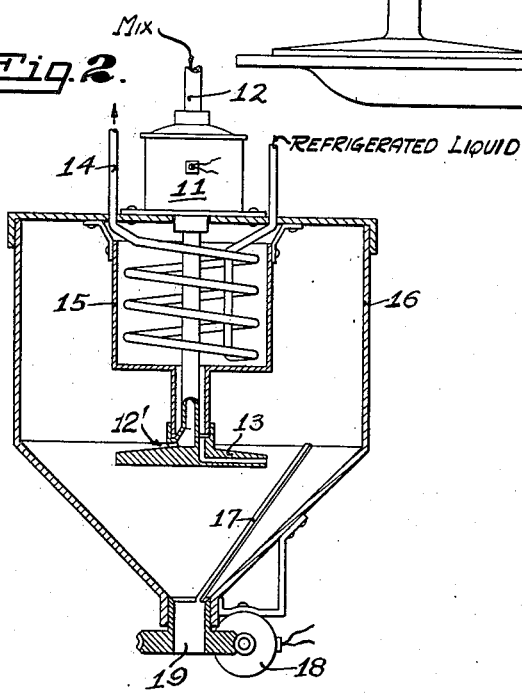
Ernest Edison Lindsey,
INVENTOR.

Patented June 8, 1937

2,083,072

UNITED STATES PATENT OFFICE 2,083,072

APPARATUS FOR MAKING ICE CREAM AND OTHER EDIBLE ICES

Ernest Edison Lindsey, San Francisco, Calif.

Application August 16, 1932, Serial No. 628,979

11 Claims. (Cl. 62—114)

My invention relates to improvements in the preparation and the making of ice cream and other edible ices whereby same are frozen very quickly or instantly and due to the manner of preparation and freezing assume a quite different and superior texture and appeal to the palate than do those made in the usual and customary method in which ice cream freezers of the commonly known kind and type are used as the freezing medium.

It is well known that in the making or manufacture of what may be termed commercial ice cream, the ice cream mixture is introduced into the freezer and is there frozen to a semi-liquid consistency, after which the mixture is withdrawn from the freezer into containers which are then stored away in order that said mixture may "harden" or "ripen". This "hardening" or "ripening" requiring a considerable length of time, usually from eight to twenty-four hours being required, in a cabinet or other device kept at a temperature well under the freezing point, before the ice cream or other product is considered fit to be served to the consumer.

In my invention, the ice cream, or other frozen ice, is immediately prepared from the cream or other mix and is ready to serve forthwith. Also it assumes a "fluffed-up" appearance, is quickly soluble in the mouth, can be prepared in quantities just as the trade demands and provides the means of serving the customer individually with varying proportions of flavor etc., which would be impracticable where the usual methods are being followed and used. Though in this regard it must be understood that there are no limits to the quantities which may be prepared and produced at one time or at any time, because my invention provides for the manufacture of small amounts or large amounts and what I claim as my invention covers the process involved in the doing of the same.

This process consists of atomizing the material to be frozen and bringing it, while in such atomized condition, in contact with air, under pressure or otherwise, which has been refrigerated or reduced in temperature to the point where the said air provides the media, the cold, necessary to freeze, to the point desired, the ice cream mix or other edible mixtures which it is desired so to treat or freeze.

It will be seen that there are a number of mechanical devices and combinations which may be used and resorted to to accomplish the above described purpose. Two of such devices are described as here follows, the same being illustrated by the drawing forming a part of this application and specification and hereinafter referred to as Figure 1 and Figure 2, both being sectional views of my device.

Therefore, in order that my invention shall be the better and more quickly understood, I hereby refer to the drawing as above mentioned, taking up first that shown in Figure 1 which is the preferred device by which my invention may be applied. Said Figure 1 being a cross sectional view illustrating a mechanical device designed for the application of my said invention, the functioning of which is as follows:

In Figure 1, the numeral 1 indicates a tube through which refrigerated air is caused to pass, said air being supplied from a source not here shown. Numeral 2 indicates a tube through which is supplied, likewise from a source not here shown, the material desired to be frozen. Numeral 3 indicates the orifice through which the refrigerated air is discharged. Numeral 4 indicates the nozzle tip through which the material to be frozen is finally delivered. Numeral 5 indicates an insulated cylinder which is removably attached to the mounting, said mounting being indicated by numeral 6. Numeral 7 and numeral 8 indicate screens of fine mesh. Numeral 9 indicates a spring held, telescoping stand or support, and numeral 10 indicates a dish or receptacle into which the frozen material is deposited.

In operation, the dish or receptacle 10 is placed in position on the stand 9. Refrigerated air is admitted through a suitable valve to tube 1 and is ejected at orifice 3, passing downward against dish 10 and then upward along the walls of cylinder 5, through the screens 7 and 8 and out to waste through the openings in the top and side of the mounting 6. By means of a suitable valve, not shown, the material to be frozen is admitted to tube 2, passing thence to the nozzle 4 where it is struck by the refrigerated air passing through orifice 3. This refrigerated air causes the material being supplied through nozzle 4 to become atomized and at the same time provides the cold necessary to freeze the said material in the said atomized condition and deposit the same in the dish or receptacle 10. The said frozen material, so deposited in dish 10 being then ready to serve.

In Figure 2, is shown a modified form of a mechanical device through which my invention may be applied. The same being intended for larger, or what may be termed "commercial" installations. Numeral 11 indicates an electric motor or other source of power. Numeral 12 is a hollow shaft passing through said motor to which is attached a revolvable member, said revolvable member being indicated by numeral 13. This said revolvable member 13 being a combination fan and conical disc. Numeral 14 indicates the refrigerating or cooling coil, mounted in the well, said well being indicated as numeral 15. Numeral 16 indicates an insulated, covered, conical bottomed tank. Numeral 17 indicates a scraper which is caused to slowly rotate by power applied to the reduction gear, said reduction gear being indicated by numeral 18. Numeral 19 indicates a revolving discharge member through which the frozen material is discharged.

In operation, suitable means of refrigeration, not here shown, is applied to the coil 14. The motor 11 is set in operation which in turn causes the conical fan and disc 13 to revolve. This action of 13 draws the air downward out of the well 15 and over the refrigerated coils 14, discharging said air outward toward the walls of the tank 16, where it then follows a course upward and back into the well 15 and again over the coils 14. This action being repeated over and over again thus maintaining a freezing temperature in the said air being thus kept in circulation. The material to be frozen is admitted to the hollow shaft 12 through a suitable pipe, not shown, passing downward and out through suitable openings 12' and distributed on top of the revolving disc 13 whereby centrifugal force said material is caused to travel to the periphery of said revolving disc 13 and is discharged therefrom as a fine or atomized spray into the current of air, said air being at a freezing temperature as hereinabove described. This atomized, frozen material being then deposited on the bottom and side walls of the tank 16 from where it is dislodged by the rotating scraper 17, passing out through the revolving discharge member 19 into suitable containers, not shown, said containers being thereafter handled and disposed of in whatever way may be desired.

As has been heretofore stated, a number of mechanical methods may be resorted to for the application of my invention and giving approximately identical results, two of such methods having been above described. I wish it understood, however, that I am not limited by those particular methods set out and described but claim also the rights to those other methods which produce a like or similar result in the application of my invention.

Having thus described my invention, what I claim and desire to secure by Letters Patent is:

1. The process of making edible ices which consists of preparing the materials to be frozen into a mixture and thereafter atomizing the mixture by the impact of a refrigerated gaseous substance.

2. Means for freezing a liquid in finely divided form which comprises a container, means for introducing said liquid into said container, and means for projecting a refrigerated gaseous medium against said liquid to simultaneously atomize and freeze said liquid.

3. Means for freezing a liquid in finely divided form which comprises a container, a nozzle for introducing a stream of liquid into said container, and means associated with said nozzle for directing a refrigerated gaseous medium into said stream to atomize said stream and to freeze the droplets formed by atomization.

4. Means for freezing a liquid in finely divided form which comprises a container, a nozzle for introducing a stream of liquid into said container, means associated with said nozzle for directing a refrigerated gaseous medium into said stream to atomize said stream and to freeze the droplets formed by atomization, and means normally forming a portion of the container for collecting the frozen material.

5. Means for freezing a liquid in finely divided form which comprises a container, a nozzle for introducing a stream of liquid into said container, means associated with said nozzle for directing a refrigerated gaseous medium into said stream to atomize said stream and to freeze the droplets formed by atomization, and means for allowing the escape of the gaseous medium while preventing the escape of the frozen material.

6. Means for freezing a liquid in finely divided form which comprises an upright container, an atomizing nozzle in the upper portion of said container, means for supplying the liquid to be frozen and a refrigerated medium to said nozzle to cause atomization of said liquid by the impact of said medium, and removable means normally closing the bottom of said container for collecting the frozen material.

7. Means for freezing a liquid in finely divided form which comprises an upright container, an atomizing nozzle in the upper portion of said container, means for supplying the liquid to be frozen and a refrigerated medium to said nozzle to cause atomization of said liquid by the impact of said medium, and a screen surrounding the nozzle to allow escape of the gaseous mediums and to prevent escape of frozen material.

8. Means for freezing a liquid in finely divided form which comprises a hollow shaft, means for rotating said shaft, means for supplying a liquid to be frozen to one end of said shaft, a centrifugal spray nozzle mounted on the other end of said shaft and connected to the hollow of said shaft to be supplied with liquid therefrom, a chamber around a portion of said shaft, means for cooling the air in said chamber below the freezing point of said liquid, and means for supplying the cooled air to said spray nozzle to cause peripheral emission of said air into liquid atomized by said nozzle to freeze the atomized liquid.

9. Means for freezing a liquid in finely divided form which comprises a hollow shaft, means for rotating said shaft, means for supplying a liquid to be frozen to one end of said shaft, a centrifugal spray nozzle mounted on the other end of said shaft and connected to the hollow of said shaft to be supplied with liquid therefrom, a chamber around a portion of said shaft, means for cooling the air in said chamber below the freezing point of said liquid, means for supplying the cooled air to said spray nozzle to cause peripheral emission of said air into liquid atomized by said nozzle to freeze the atomized liquid, and means for collecting the frozen material.

10. Means for freezing a liquid in finely divided form which comprises a hollow shaft, means for rotating said shaft, means for supplying a liquid to be frozen to one end of said shaft, a centrifugal spray nozzle mounted on the other end of said shaft and connected to the hollow of said shaft to be supplied with liquid therefrom, a chamber around a portion of said shaft, means for cooling the air in said chamber below the freezing point of said liquid, means for supplying the cooled air to said spray nozzle to cause peripheral emission of said air into liquid atomized by said nozzle to freeze the atomized liquid, an inverted conical container positioned to receive the frozen material on the inner walls thereof, and means for collecting the frozen material deposited thereon.

11. Means for freezing a liquid in finely divided form which comprises a hollow shaft, means for rotating said shaft, means for supplying a liquid to be frozen to one end of said shaft, a centrifugal spray nozzle mounted on the other end of said shaft and connected to the hollow of said shaft to be supplied with liquid therefrom, a chamber around a portion of said shaft, means for cooling the air in said chamber below the freezing point of said liquid, means for supplying the cooled air to said spray nozzle to cause peripheral emission of said air into liquid atomized by said nozzle to freeze the atomized liquid, an inverted conical container positioned to receive the frozen material on the inner walls thereof, said container having an open apex, and means for directing frozen material deposited on the walls thereof toward said apex.

ERNEST EDISON LINDSEY.